(12) United States Patent
Kjøsnes et al.

(10) Patent No.: US 12,460,508 B2
(45) Date of Patent: Nov. 4, 2025

(54) ELECTRONIC INFLOW CONTROL DEVICE

(71) Applicant: Equinor Energy AS, Stavanger (NO)

(72) Inventors: Ivar Kjøsnes, Trondheim (NO); Bjarne Bugten, Saksvik (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 18/688,527

(22) PCT Filed: Aug. 31, 2022

(86) PCT No.: PCT/NO2022/050206
§ 371 (c)(1),
(2) Date: Mar. 1, 2024

(87) PCT Pub. No.: WO2023/033657
PCT Pub. Date: Mar. 9, 2023

(65) Prior Publication Data
US 2024/0352827 A1    Oct. 24, 2024

(30) Foreign Application Priority Data

Sep. 2, 2021  (GB) ...................................... 2112525

(51) Int. Cl.
*E21B 34/06*    (2006.01)
(52) U.S. Cl.
CPC ................................. *E21B 34/066* (2013.01)
(58) Field of Classification Search
CPC ..... E21B 34/066; F16K 31/082; F16K 31/084
See application file for complete search history.

(56) References Cited

U.S. PATENT DOCUMENTS 4,295,795 A * 10/1981 Gass ..................... E21B 43/123
                                                    137/155
4,392,632 A *  7/1983 Gast ...................... F16K 31/082
                                                    251/360
4,681,298 A *  7/1987 Bodine ............... F16K 31/0668
                                                    251/129.1

(Continued)

FOREIGN PATENT DOCUMENTS

EA    201900434 A1    3/2021
GB    2 450 681 A     1/2009

(Continued)

OTHER PUBLICATIONS

International Search Report, issued in PCT/NO2022/050206, dated Oct. 12, 2022.

(Continued)

*Primary Examiner* — Giovanna Wright
(74) *Attorney, Agent, or Firm* — Birch, Stewart, Kolasch & Birch, LLP (57) ABSTRACT

An electronic inflow control device for use in a hydrocarbon producing well is configured to switch electronically between an open state and a closed state. The inflow control device includes a housing, including one or more electromagnets; a gate including one or more permanent magnets and moveable within the housing between a closed state and an open state; the housing defining a first valve seat for receiving the gate in a closed state, and a second valve seat for receiving the gate in an open state.

18 Claims, 9 Drawing Sheets

(56) References Cited

U.S. PATENT DOCUMENTS

| | | | |
|---|---|---|---|
| 4,770,389 A * | 9/1988 | Bodine | F16K 31/082 |
| | | | 251/129.1 |
| 4,771,982 A | 9/1988 | Bodine et al. | |
| 6,517,045 B1 * | 2/2003 | Northedge | F16K 31/082 |
| | | | 251/65 |
| 7,086,383 B2 * | 8/2006 | Ivens | F16K 31/0651 |
| | | | 123/458 |
| 9,845,898 B1 * | 12/2017 | Johnson | F16K 17/02 |
| 10,125,892 B2 * | 11/2018 | Bentz | F16K 27/0245 |
| 2003/0047308 A1 * | 3/2003 | Hirsch | E21B 47/06 |
| | | | 166/250.15 |
| 2004/0256584 A1 | 12/2004 | Zimmerling et al. | |
| 2017/0074418 A1 | 3/2017 | Liang et al. | |
| 2017/0254438 A1 * | 9/2017 | Ulbricht | F16K 31/0679 |
| 2019/0242213 A1 * | 8/2019 | Hunter | E21B 34/066 |
| 2021/0331654 A1 | 10/2021 | Stahr et al. | |

FOREIGN PATENT DOCUMENTS

| | | |
|---|---|---|
| WO | WO 2017/164868 A1 | 9/2017 |
| WO | WO 2019/011652 A1 | 1/2019 |

OTHER PUBLICATIONS

United Kingdom Search Report, issued in Priority Application No. 2112525.7 dated Feb. 8, 2022.
Written Opinion of the International Searching Authority, issued in PCT/NO2022/050206, dated Oct. 12, 2022.

* cited by examiner

ELECTRONIC INFLOW CONTROL DEVICE

The present invention relates to hydrocarbon production systems, and more specifically to an electronic inflow control device used in a well system, a smart well system, or an advanced well system.

BACKGROUND

In an effort to improve the production and recovery of oil and gas reservoirs, well completion methods and systems have become increasingly complex over recent years. Conventional vertical wells are being replaced with horizontal and/or multilateral wells with greater well reservoir contact. Whilst such structures can enjoy an improvement in production efficiency, they are also more costly and complicated to drill and install. After installation, variations in reservoir pressure and/or the well-known "heel-toe" effect can cause non-uniform inflow along the well, which can result in early gas and/or water breakthrough. As such, these complicated well structures cannot be efficiently controlled via a surface wellhead choke. Instead, inflow is controlled downhole.

A number of different inflow-restriction systems have been proposed in the background art. These can be categorised broadly into three categories: passive, active and reactive.

In a passive system, inflow control devices (ICD) are used to restrict inflow to differing degrees along a producing interval in a well. ICDs comprise nozzles or channels, which restrict the flow of fluid. The degree of restriction is sometimes known as the ICD "strength". There are various different types of ICD, including nozzle, orifice, helical and labyrinth. The basic working principle is to vary the strength of each ICD along the base string in such a way as to produce a more uniform inflow. The strength of the ICD is set by the geometry and dimension of the fluid channel and is therefore fixed after installation. The resulting system is passive and unable to adapt to dynamic changes. These fluid channels, and therefore the ICDs, cannot be closed.

In a reactive system, autonomous inflow control devices (AICD) or autonomous inflow control valves (AICV) are used, which are able to self-adjust to restrict unwanted fluid flows, depending on the viscosity and density of the reservoir fluid. AICD/AICV-based systems can be designed to reduce/prevent the flow of water and/or gas and increase/allow the flow of oil.

In an active system, the well completion structure is divided into zones using packers and the inflow of each zone is controlled using an inflow control valve (ICV) located on the inside of a sandscreen or perforated liner.

In any of the aforementioned type of inflow-restriction system, isolation packers may be present to compartmentalize the reservoir into sections.

STATEMENT OF INVENTION

According to a first aspect of the invention, there is provided an electronic inflow control device for use in a hydrocarbon producing well, the inflow control device being configured to switch electronically between an open state and a closed state, the inflow control device comprising: a housing, comprising one or more electromagnets; a gate comprising one or more permanent magnets and moveable within the housing between a closed state and an open state; the housing defining a first valve seat for receiving the gate in a closed state, and a second valve seat for receiving the gate in an open state.

Optionally, the electronic control device may further comprise one or more of the following features:

- Wherein the first valve seat comprises a first biasing means for biasing the gate to the closed position, and/or, wherein the second valve seat comprises a second biasing means for biasing the gate to the open position;
- Wherein the first and/or second biasing means comprises a mechanical or magnetic biasing means, wherein the mechanical biasing means comprise a friction fit or snap fit and wherein the magnetic biasing means comprise a ferromagnetic material provided within the valve seat, and wherein the ferromagnetic material is arranged to be attracted by said one or more permanent magnets.
- Wherein a magnetic field generated by the one or more electromagnets has a first polarity controllable by an electric current in the electromagnets, wherein the one or more permanent magnets have a second polarity, and wherein the first polarity and second polarity have the same direction in a first direction of the electric current, and have an opposite direction in a second direction of the electric current;
- Wherein the gate defines a central opening, and wherein the central opening is part of the fluid communication channel in the open state;
- Wherein the gate has sidewalls which block the fluid communication channel in the closed state;
- wherein the gate defines side openings which can be selectively aligned with side openings in an insert of the housing extending into the gate;
- The electronic inflow control device is electrically connected to a microcontroller for controlling the electric current through the one or more electromagnets;
- The electronic inflow control device further comprises a landing arrangement configured to spatially separate the one or more permanent magnets from their respective valve seats;
- wherein the gate defines two opposing faces with substantially equal surface area, when projected onto a transverse plane of the electronic inflow device.

According to a second aspect of the invention, there is provided a method of controlling inflow of fluids into a well by controlling an electric current through one or more electromagnets in an electronic inflow control device, the electronic inflow control device comprising: a housing, comprising said one or more electromagnets; a gate comprising one or more permanent magnets and moveable within the housing between a closed state and an open state; the housing defining a first valve seat for receiving the gate in a closed state, and a second valve seat for receiving the gate in an open state; wherein sending an electric current in a first direction through the electromagnet opens the device, and wherein sending an electric current in a second direction through the electromagnet closes the device.

Optionally, further comprising remotely addressing a microcontroller with a unique signal, causing the microcontroller to send said electric current in the first direction or the second direction.

The method may further comprise receiving a signal from a measurement device, and controlling the electric current in response to said signal. Optionally, wherein the measurement device is arranged to measure one or more of: inflow rate, fluid phase, temperature or conductivity of inflow fluid. In some examples, measuring the fluid phase comprises measuring an inflow of water or gas into a well, and closing the electronic inflow control device in response to said measuring of the water or the gas.

BRIEF DESCRIPTION OF THE FIGURES

Embodiments of the invention will now be described for example only with reference to the following drawings in which.

DETAILED DESCRIPTION

The inflow control device described herein is opened or closed electronically. Although other forces due to fluid flow or gravity act on the inflow control device, those other forces are small compared to the electromagnetic magnetic forces and are therefore not discussed in detail. The device is stable both in the closed position and in the open position, and will remain in the open or closed position unless the electromagnetic force is activated for the purpose of switching between the open and closed states.

The device comprises a gate, which can be moved between open and closed positions. A first valve seat is provided for receiving the gate in a closed position, and a second valve seat is provided for receiving the gate in an open position. When received in the first or second valve seats, a biasing means is provided to secure the gate in a stable position.

The biasing means can be mechanical. A first example of a mechanical biasing means is a tapered internal diameter of the seat. When the gate moves towards the narrow end of the tapered internal diameter, the gate will become 'stuck' by a friction fit. The friction fit can be overcome by the electromagnetic force, which will be described below. A second example of a mechanical biasing means is a resiliently deformable O-ring provided within the internal wall of the seat. There are many known examples of suitable O-rings, made of PTFA, Neoprene, EPDM rubber or the like. When the gate is received within the O-ring, the deformable material will hold the gate in place. The electromagnetic force is large enough to move the gate out of the seat with the resiliently deformable O-ring.

The biasing means may be magnetic. A permanent magnet is provided in the seat, and the magnet is biased towards the gate by a ferromagnetic material or another permanent magnet with opposite polarity provided within the gate. The arrangement may also be the other way around, whereby a permanent magnet is provided in the gate, and a ferromagnetic material is provided within the seat. The electromagnetic force will be large enough to overcome the magnetic force.

As there are two seats, various permutations of magnets and/or mechanical biasing means are possible.

The electromagnetic force for switching between the open and closed states is provided by an electromagnet arranged within the housing acting on a permanent magnet arranged within the gate. The electromagnet comprises one or more windings of electrically conducting material, which provides a magnetic field when an electric current travels through the conducting material. The direction of the magnetic field can be switched by switching the direction of the electric current. The central axis of the field of the permanent magnet is aligned with the central axis of the magnetic field of the electromagnet, but the polarity of the electromagnet can be switched between being in opposite direction or being in the same direction. The permanent magnet in the gate has a fixed direction, so when the direction of the current is switched, the gate can be switched between open and closed position.

The housing is designed such that in the open position the gate provides an open channel between the inlet and outlet of the device, while in the closed position, the gate blocks the path between the inlet and outlet, thereby closing the device. Although various arrangements are possible to achieve the same effect, a specific embodiment will now be described.

Figure 1:
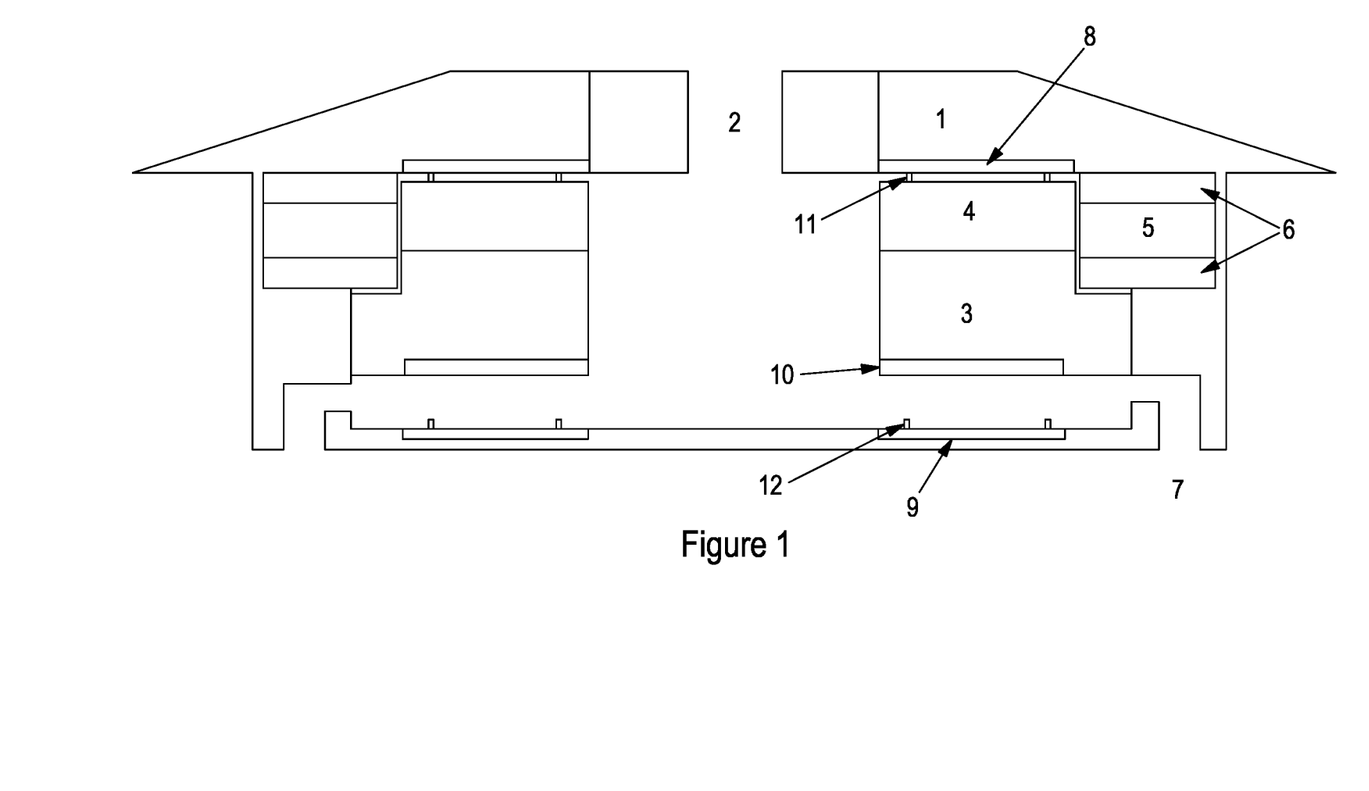
FIG. 1 is a vertical cross section through a schematic of an electronic inflow control device.

FIG. 1 shows a vertical cross section through a schematic drawing of the electronic inflow control device. A housing 1 is provided, which is preferably made of a non-magnetic material. An inlet 2 (or nozzle) is provided within the housing. The inlet is made of a non-magnetic material and is preferably removably attached to the housing. The inlet can be fixed by way of a screw-fit, for example. The inlet will be subject to a significant amount of wear due to the inflow of sand, debris or other hard materials. By providing a replaceable inlet, the lifetime of the device can be increased. If the inlet is accessible during use or after use, the inlet can be replaced. However, during typical use the inlet is not easily accessible after well completion. In that case, the lifetime of the device can be increased by using a different material for the inlet than for the other parts of the device, preferable a hard-wearing material; examples are known to the skilled person.

A gate 3 is provided within the housing. In the illustrated arrangement, the main body of the gate 3 is made of a non-magnetic material. The housing defines a generally tubular internal cavity and receives a generally cylindrical gate, which can move within the tubular internal cavity between a closed and open position. The gate includes a permanent magnet 4 at the top of the gate, and the direction of the field is north up and south down in the orientation of the device shown in the figure. This polarity should be not viewed as limiting, but merely exemplary; the skilled reader would appreciate that the electronic inflow control device may instead operate in substantially the same way with the permanent magnet being of opposite polarity (north down and south up in the figure). An electromagnet 5 is provided within the housing, with windings going around the tubular internal cavity, and perpendicular to the plane of the vertical cross section of FIG. 1, such that the main axis of the magnetic field coincides with the main axis of the device, and also coincides with the main axis of permanent magnet 4. A ferromagnetic core 6 is provided, for example made of an iron-based material, for strengthening and directing the magnetic field from the electromagnet.

FIG. 1 illustrates the gate in the open position. The gate defines a central channel, which is aligned with the opening of inlet 2. The fluid path, defined by the inlet and the central channel of the gate, continues underneath the gate in the open position and then continues to an outlet 7 provided in circumferential direction of the housing. The outlet may be continuous around the circumferential direction, but preferably is interrupted by one or more connections between the main part of the housing and a bottom part of the housing.

A ferromagnetic insert 8 is provided within the internal cavity of the housing at the top, adjacent to permanent magnet 4 of the gate to bias the gate in the open position. A second ferromagnetic insert 9 is provided within the bottom part of the housing and adjacent a further permanent magnet 10 provided within the gate at the bottom part of the gate in the closed position.

When the magnetic field generated by electromagnet 5 has the same direction as the magnetic field of permanent magnet 4, with the north side up and the south side down, then the gate will be pushed away from the closed position towards the open position. In the open position, the gate will be stable because of the attraction between permanent magnet 10 and ferromagnetic material 9, and the electromagnet can be switched off until opening of the device is required.

A landing arrangement 11 is provided between the permanent magnet 4 and ferromagnetic insert 8 for improved sealing, to avoid a vacuum seal between the flat surfaces of the permanent magnet 4 and ferromagnetic insert 8, and to avoid the magnetic force between parts 4 and 8 being too large to overcome.

Figure 2:
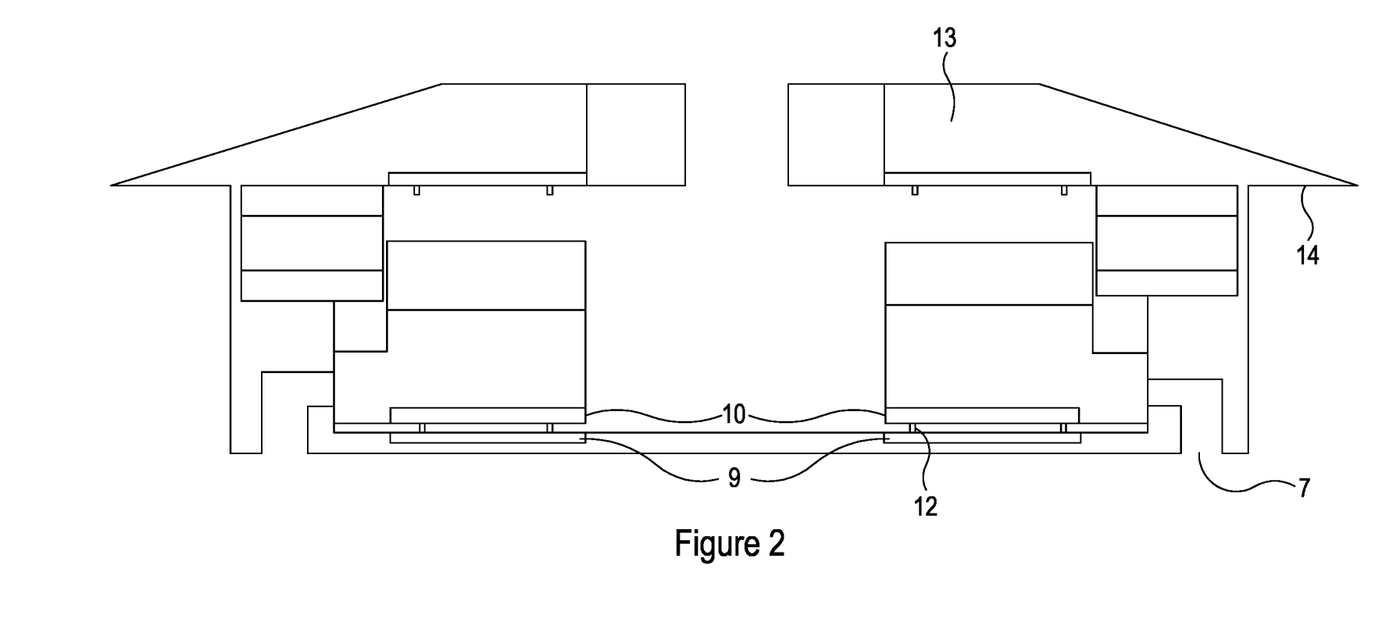
FIG. 2 is a vertical cross section through a schematic of an electronic inflow control device.

FIG. 1 illustrates the device in the open state, and FIG. 2 illustrates the same device in the closed state. The fluid path to outlet 7 is now blocked by the gate. The gate is received in the seat provided by landing arrangement 12 and is in a stable position due to the attractive force between the permanent magnet 10 and ferromagnetic insert 9.

The top 13 of the housing has a frusto-conical shape to improve the smooth fluid flow towards the inlet. The top is also slightly wider than the main part of the housing, and the overhang 14 improves the seal and connection when set into an opening in a screen or pipe. The overhang 14 can engage with a corresponding shoulder of the opening.

The directions in this description of the figures make use of the words 'up', 'down', 'top' and 'bottom', but it will be appreciated that these directions are only relevant in relation to the orientation shown in the figure. The device can have any orientation during use, including the reverse, 'upside-down' orientation, when compared to how it is represented in the figures.

Figure 3:
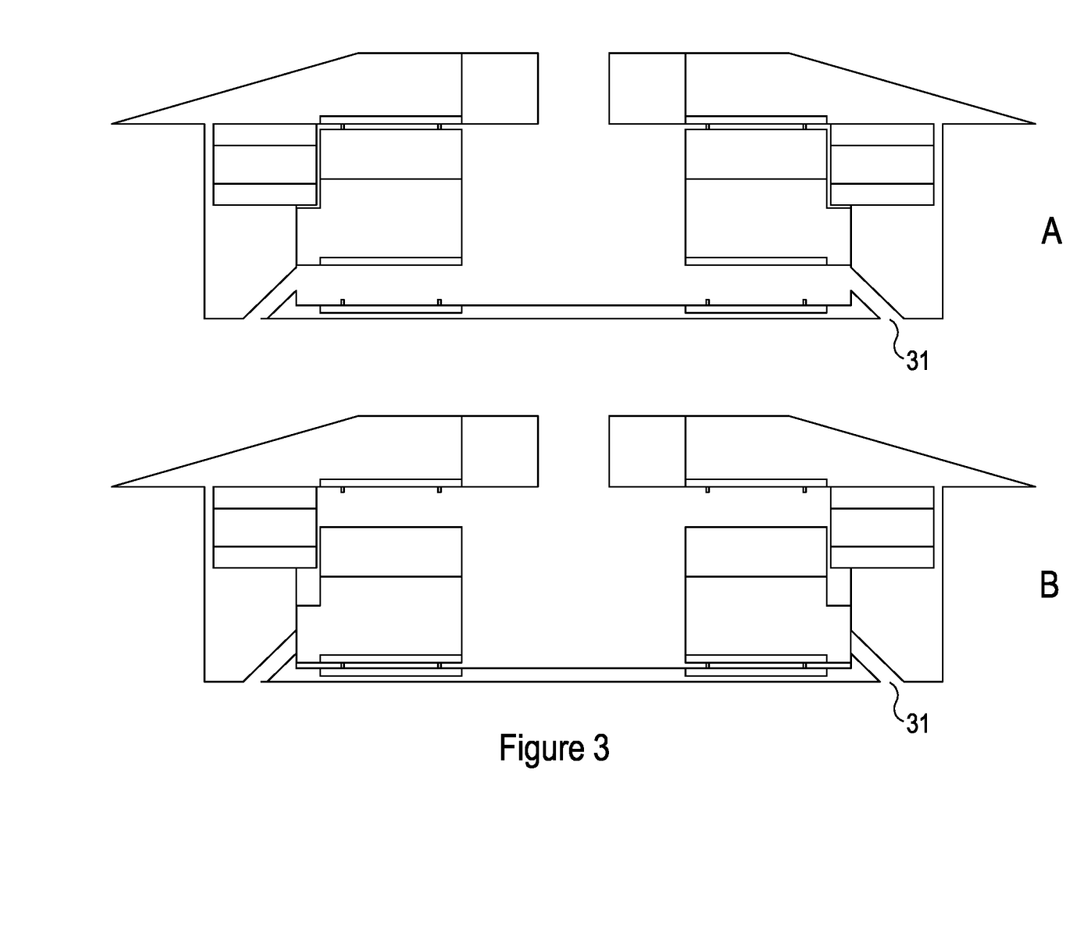
FIG. 3 is a vertical cross section through a schematic of an electronic inflow control device.

FIG. 3 illustrates a device which generally corresponds to the device shown in FIGS. 1 and 2, but the outlet has a slightly different shape. Figure A illustrates the open position, while figure B illustrates the closed position. The outlet channel 31 has a diagonal direction, while the outlet in FIGS. 1 and 2 is an inverted L-shape including a corner. The main advantage of this direction is that the corner is avoided and machining of the outlet during manufacturing is easier.

Figure 4:
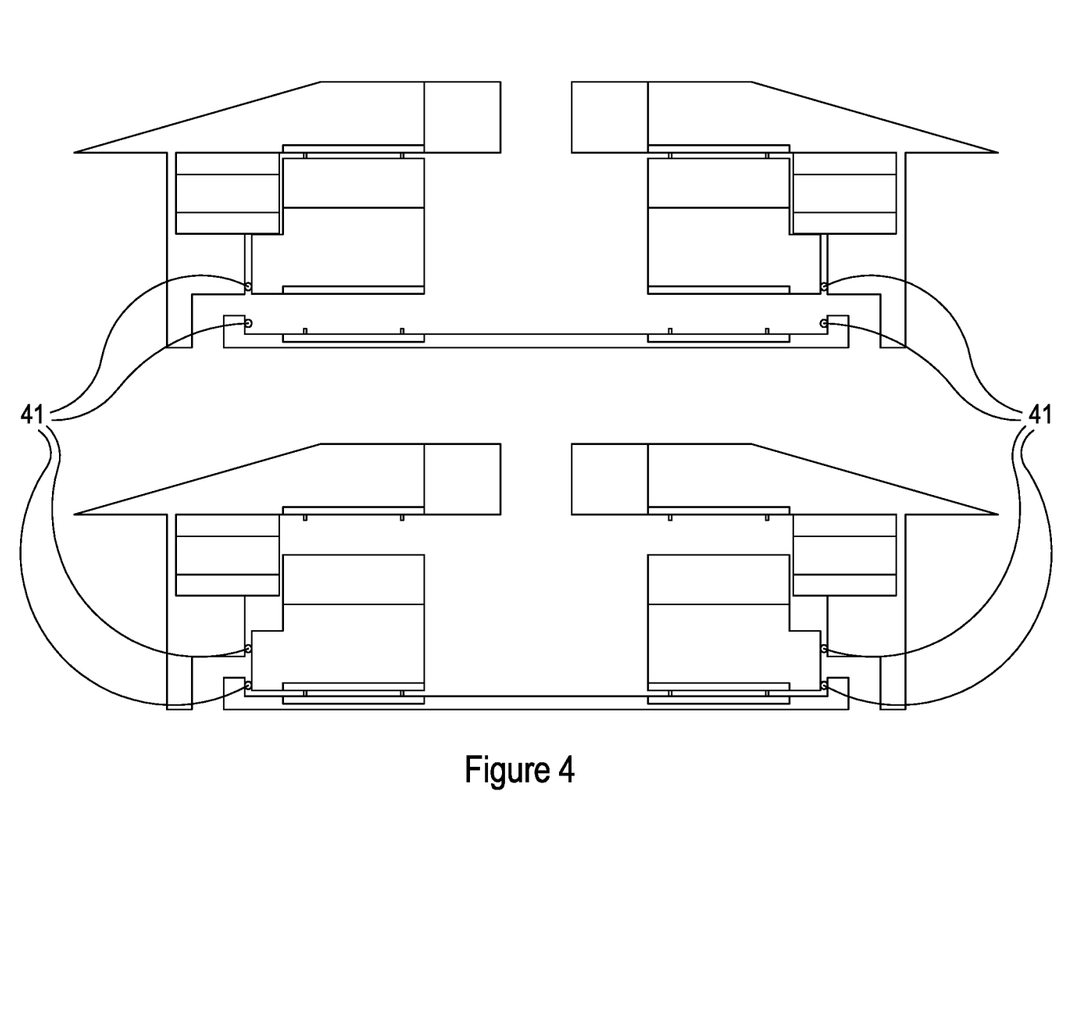
FIG. 4 is a vertical cross section through a schematic of an electronic inflow control device.

FIG. 4 illustrates a further device in open and closed configuration. The difference over the device in the preceding figures is that the gap between the gate and the generally tubular internal cavity of the housing is slightly bigger. The gap is sealed by multiple seals 41. The provision of seals requires an additional element, but on the other hand the tolerances for manufacturing the housing and the gate can be slightly larger. The seals can be made of a resiliently deformable material suitable for use in a well, which the skilled person is aware of.

Figure 5:
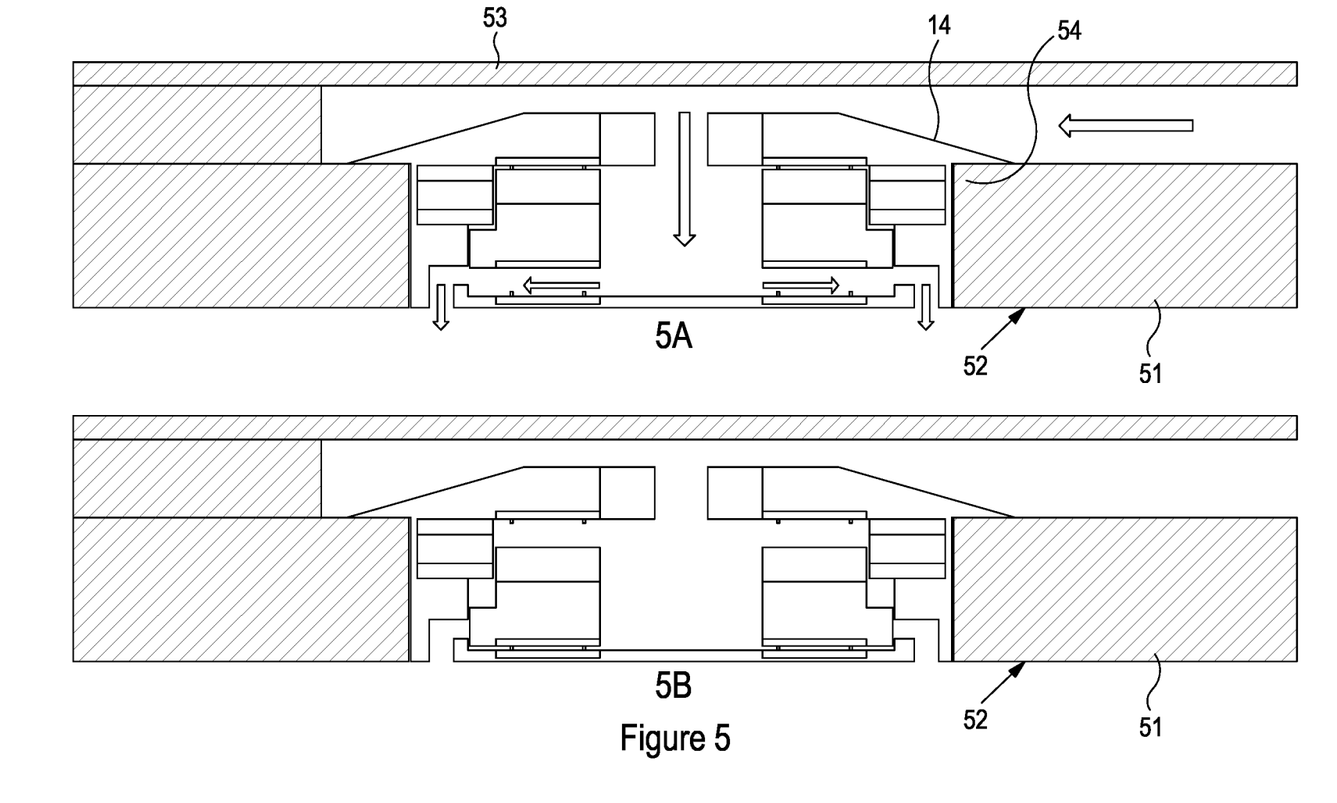
FIG. 5 is a vertical cross section through a schematic of an electronic inflow control device installed in a pipe section.

FIG. 5 illustrates the device installed within a screen section. FIG. 5A illustrates the open position, with the arrows indicating the inflow. FIG. 5B illustrates the closed position. A tubing 51 is shown, but only one side of the tubing is shown with the device in place. The inside of the tubing 51 is illustrated with arrow 52. A screen 53 is attached to the outside of the tubing, and can be a sand screen. A sand screen keeps sand or larger debris out, while letting fluids through. A channel is provided between the sand screen and the tubing to allow fluid flow towards the inlet device. As described previously, the frusto-conical shape of the top of the housing of the device provides a smooth inflow path. Overhang 14 engages with a shoulder 54 in the tubing to ensure a good seal and to retain the device in the opening of the tubing. The device is flush with the inside 52 of the tubular.

Figure 6:
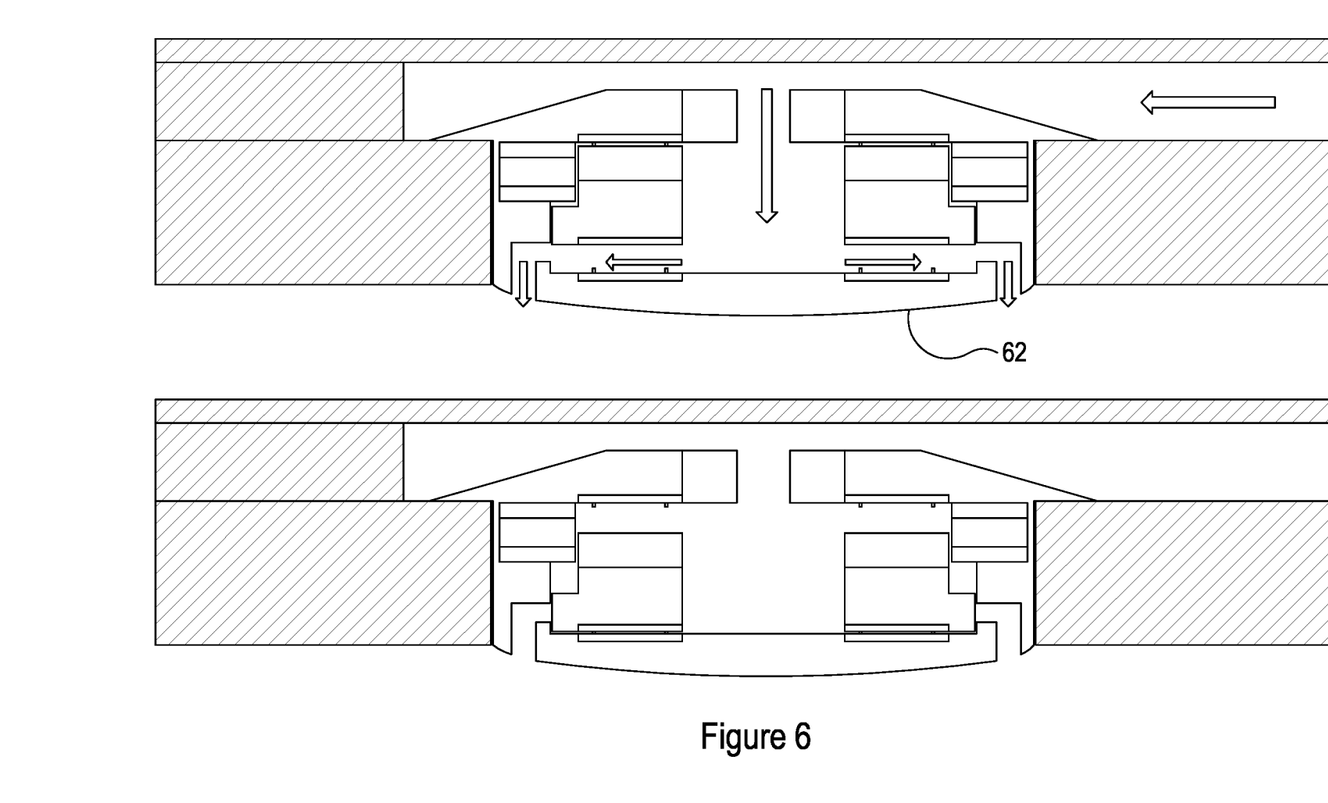
FIG. 6 is a vertical cross section through a schematic of an electronic inflow control device installed in a pipe section.

FIG. 6 illustrates a similar arrangement to that of FIG. 5, but instead of the inflow device being flush with the inside 52 of the tubular, the device protrudes into the inside of the tubular. This arrangement may be used if the thickness of the wall of the tubular is insufficient to accommodate the inflow device while being flush with the inside of the tubular. The protruding part 62 gradually extends into the interior of the tubular and is generally smooth to minimise disruption to the fluid flow within the tubular. The rounded shape of the protruding part 62 also ensures that intervention tools (or any other tooling), which may be run in the well, cannot "catch" on any edges of the electronic flow control device, which may damage the intervention tool and electronic flow control device.

Figure 7:
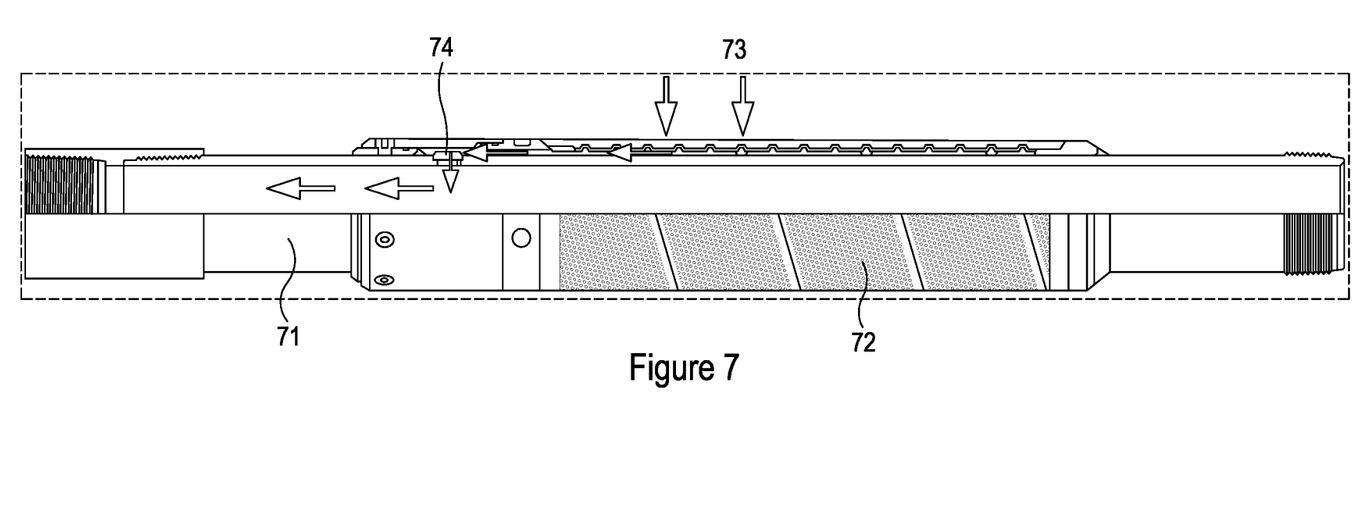
FIG. 7 is a side view of a partially opened-up sand screen with an inflow control device.

FIG. 7 illustrates a side view of a partially opened tubular 71 with a sand screen 72. Arrows 73 illustrated the inflow of fluids through the sand screen and into the tubular 71, through inflow control device 74.

The diameter of the main housing of a typical inflow control device can be around 33 mm, and the thickness 14 mm. The inflow opening may be between 2.5 and 9 mm. However, larger and smaller dimensions are possible.

As detailed above, the landing arrangements 11, 12 are provided between the permanent magnets 4, 10 and their respective ferromagnetic inserts 8, 9 for improved sealing. As the landing arrangements 11, 12 spatially separate the permanent magnets 4, 10 from the ferromagnetic inserts 8, 9, they allow fluid to pass over both opposing faces of the gate, when in the closed and open position, such that fluid pressure acts on both opposing faces of the gate. Preferably, but not necessarily, the projected surface area of each opposing face of the gate onto the transverse plane of the electronic inflow control device is substantially equal, such that the net force exerted on the gate 3, urging the gate 3 between the closed and open position, is substantially zero. For the avoidance of doubt, the surface normal of the transverse plane is collinear with the direction of travel of the gate 3 between the closed and open position. This reduces the force required to switch the position of the gate.

In some examples, the pressure of fluid acting on each opposing face of the gate may differ (but this is expected only to be by a small amount) and in those examples, the gate 3 is considered to be "near" pressure balanced. The force required to switch the position of the gate is still reduced.

Figure 8:
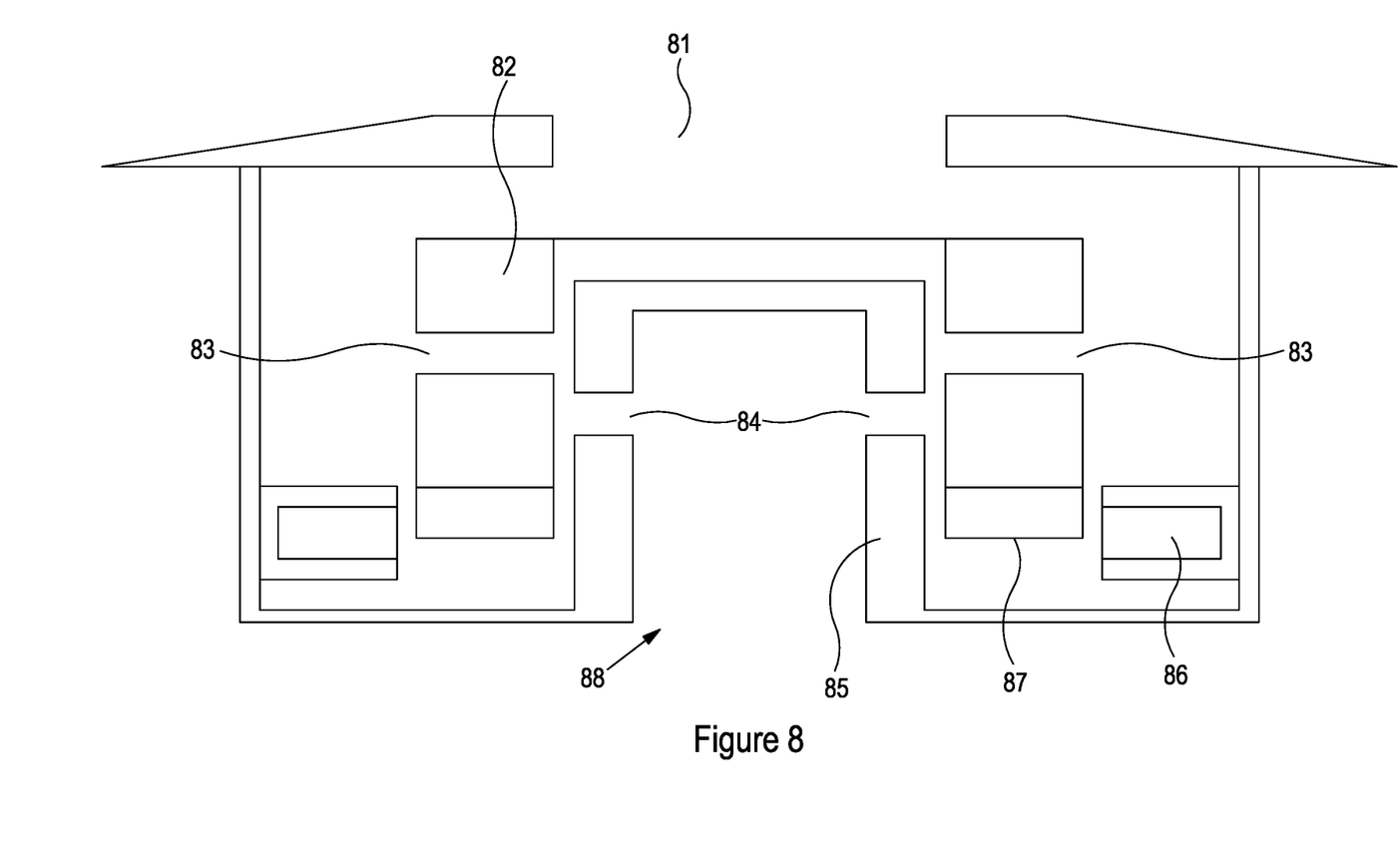
FIG. 8 is a vertical cross section through a different example of an electronic inflow control device.

The same general concepts presented above can be put into effect in a different arrangement, such as the alternative embodiment illustrated in FIG. 8. Many details have been omitted in FIG. 8, as it is intended to show the different overall design of the housing and the gate. An inlet 81 is provided as before. The gate 82 now has a top-hat shape instead of the ring shape shown before. The gate has openings 83 on the side which can be lined up with openings 84 provided on an insert 85 of the housing extending into the gate 82. The gate is shown in a closed position, but not yet abutting the top of the housing. An electromagnet 86 is provided, attached to a ferromagnetic core, which selectively attracts or repels a permanent magnet 87 on the gate depending on the direction of the current through the electromagnet. The outflow will now take place through the centre 88 of the device, instead of through openings on the side as shown in the previous examples.

An advantage over existing autonomous control valves is that the opening or closing can be complete, as opposed to the partial opening or closing. When a large water surge occurs in a well, for example, it might be preferable to completely close all corresponding inflow control devices to shut out the water.

A method of controlling the electronic inflow control device, eICDs described above will now be discussed. The electromagnet is controlled by sending an electric current in one of two directions, as described above. In a practical implementation, many eICDs may be used in a well section. The individual eICDs are each controlled by a dedicated microcontroller, which may be located close to the eICD, for example on the same screen section as the eICD. One microcontroller may also control a group of eICDs, but then the group will operate simultaneously, so all devices in the group will be opened or closed at the same time. The microcontroller will send an electrical signal to open the one or more devices, and will send a signal of the opposite polarity to close the one or more devices. The microcontroller does not need to send any signals when no change of state is required because, as discussed before, the devices are stable both in the closed and in the open position. The 'failsafe' option, where the electronics fails, will therefore also be the latest state of the devices before the failure occurred.

The microcontroller can be addressed by a signal sent remotely, whether from the surface or from a sub-surface control device. Each microcontroller can be addressed by a unique signal, and the microcontrollers can determine whether the signal is addressed to them or to other devices. Addressing individual microcontrollers can be done by Frequency Shift Keying, FSK, for example, or other known techniques. Each microcontroller can decode the FSK signal. Using such techniques to address individual microcontrollers means that a common communication and power channel can be used for multiple different devices. The common channel can be a cable, but more recently, the use of power and signal on a tubular itself has become a feasible alternative. Induction couplers can be used for bridging joints between pipe sections, in which case AC signals will be used, but without inductive couplers DC carrier signals can also be used. Direct electrical contacting means may also be used to bridge joints between pipe sections.

The microcontrollers may also be coupled to detectors which determine properties of the local inflow, such as the phase of the fluid, temperature, flow rate, etc. The detectors may be provided close to the pipe section where the inflow control device is located, or remotely, such as at the outlet of the well. The eICDs disclosed herein therefore also enable more advanced well control systems to optimise production. For example, many hundreds or thousands of eICDs and detectors may be arranged in a multilateral well system, whereby all of the eICDs are controlled in real-time to optimise production. A human operator may not be required to make a decision about closing or opening some of the eICDs, but a real-time feedback loop in the control system will control the well system.

Figure 9:
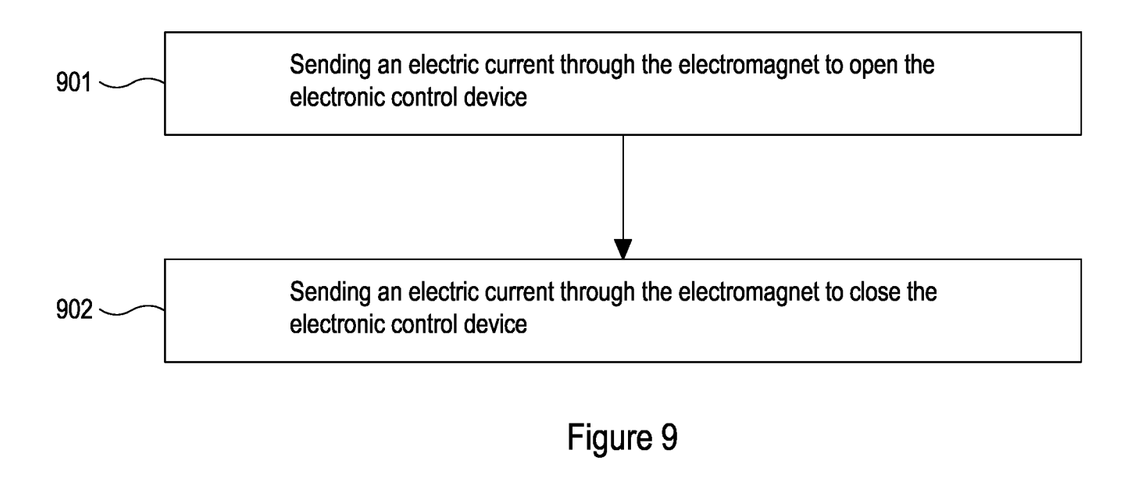
FIG. 9 is a method flow diagram.

FIG. 9 shows a method diagram for controlling inflow of fluids into a well by controlling an electric current through one or more electromagnets in the electronic inflow control device described in detail above. The method comprises: sending 901 an electric current in a first direction through the electromagnet to open the device; and sending 902 an electric current in a second direction through the electromagnet to close the device.

Although the invention has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An electronic inflow control device for use in a hydrocarbon producing well, the inflow control device being configured to switch electronically between an open state and a closed state, the inflow control device comprising:
   a housing including an electromagnet configured to generate a magnetic field having a main magnetic axis through a north pole and a south pole of the magnetic field; and
   a gate comprising one or more permanent magnets and moveable within the housing between a closed state and an open state,
   wherein the housing defines a first valve seat for receiving the gate in the closed state, a second valve seat for receiving the gate in the open state, an inlet, and an outlet,
   wherein the gate defines a fluid communication channel that extends along said main magnetic axis through which fluid can flow from the inlet towards the outlet in a direction along said main magnetic axis, when the gate is in the open state,
   wherein the gate defines a central opening, and
   wherein the central opening is part of said fluid communication channel in the open state.

2. The electronic inflow control device of claim 1, wherein the first valve seat comprises a first biasing means for biasing the gate to a closed position, and/or, wherein the second valve seat comprises a second biasing means for biasing the gate to an open position.

3. The electronic inflow control device of claim 2, wherein the first and/or second biasing means comprises a mechanical or magnetic biasing means.

4. The electronic inflow control device of claim 3, wherein the mechanical biasing means comprise a friction fit or snap fit.

5. The electronic inflow control device of claim 4, wherein a magnetic field generated by the electromagnet has a first polarity controllable by an electric current in the electromagnet,
   wherein the one or more permanent magnets have a second polarity, and wherein the first polarity and second polarity have the same direction in a first direction of the electric current, and have an opposite direction in a second direction of the electric current.

6. The electronic inflow control device of claim 3, wherein the magnetic biasing means comprise a ferromagnetic material provided within the first or second valve seat, and
wherein the ferromagnetic material is arranged to be attracted by said one or more permanent magnets.

7. The electronic inflow control device of claim 3, wherein a magnetic field generated by the electromagnet has a first polarity controllable by an electric current in the electromagnet,
wherein the one or more permanent magnets have a second polarity, and
wherein the first polarity and second polarity have the same direction in a first direction of the electric current, and have an opposite direction in a second direction of the electric current.

8. The electronic inflow control device of claim 2, wherein a magnetic field generated by the electromagnet has a first polarity controllable by an electric current in the electromagnet,
wherein the one or more permanent magnets have a second polarity, and
wherein the first polarity and second polarity have the same direction in a first direction of the electric current, and have an opposite direction in a second direction of the electric current.

9. The electronic inflow control device of claim 1, wherein a magnetic field generated by the electromagnet has a first polarity controllable by an electric current in the electromagnet,
wherein the one or more permanent magnets have a second polarity, and
wherein the first polarity and second polarity have the same direction in a first direction of the electric current, and have an opposite direction in a second direction of the electric current.

10. The electronic inflow control device of claim 1, wherein the gate has sidewalls which block the fluid communication channel in the closed state.

11. The electronic inflow control device of claim 1, electrically connected to a microcontroller for controlling an electric current through the electromagnet.

12. The electronic inflow control device of claim 1, further comprising a landing arrangement configured to spatially separate the one or more permanent magnets from their respective first and second valve seats.

13. The electronic inflow control device of claim 1, wherein the gate defines two opposing faces with substantially equal surface area, when projected onto a transverse plane of the electronic inflow control device.

14. A method of controlling inflow of fluids into a well by controlling an electric current through an electromagnet in an electronic inflow control device, the electronic inflow control device including a housing having an electromagnet configured to generate a magnetic field having a main magnetic axis through a north pole and a south pole of the magnetic field; a gate comprising one or more permanent magnets and moveable within the housing between a closed state and an open state; the housing defining a first valve seat for receiving the gate in a closed state, a second valve seat for receiving the gate in an open state, an inlet, and an outlet, the method comprising:
sending an electric current in a first direction through the electromagnet to open the electronic inflow control device; and
sending an electric current in a second direction through the electromagnet to close the electronic inflow control device,
wherein when the gate is in the open state, the gate defines a fluid communication channel that extends along said main magnetic axis through which fluid can flow from the inlet towards the outlet in a direction along said main magnetic axis,
wherein the gate defines a central opening, and
wherein the central opening is part of said fluid communication channel in the open state.

15. The method according to claim 14, further comprising:
remotely addressing a microcontroller with a unique signal, causing the microcontroller to send said electric current in the first direction or the second direction.

16. The method according to claim 14, further comprising:
receiving a signal from a measurement device; and
controlling the electric current in response to said received signal.

17. The method according to claim 16, wherein said measurement device is arranged to measure one or more of:
an inflow rate, a fluid phase, a temperature or a conductivity of inflow fluid.

18. The method according to claim 17, wherein measuring the fluid phase comprises:
measuring an inflow of water or gas into a well; and
closing the electronic inflow control device in response to said measuring of the water or the gas.

* * * * *